United States Patent
Christensen

(10) Patent No.: US 12,396,446 B1
(45) Date of Patent: Aug. 26, 2025

(54) INTERCHANGEABLE FISHING JIG HEAD

(71) Applicant: Everett Christensen, Hawley, MN (US)

(72) Inventor: Everett Christensen, Hawley, MN (US)

( * ) Notice: Subject to any disclaimer, the term of this patent is extended or adjusted under 35 U.S.C. 154(b) by 405 days.

(21) Appl. No.: 17/476,897

(22) Filed: Sep. 16, 2021

Related U.S. Application Data

(60) Provisional application No. 63/080,517, filed on Sep. 18, 2020.

(51) Int. Cl.
*A01K 95/00* (2006.01)
*A01K 83/00* (2006.01)

(52) U.S. Cl.
CPC .............. *A01K 95/00* (2013.01); *A01K 83/00* (2013.01)

(58) Field of Classification Search
CPC ...... A01K 95/00; A01K 85/029; A01K 85/16; A01K 85/1831; A01K 85/1833; A01K 83/00; A01K 85/1837
See application file for complete search history.

(56) References Cited

U.S. PATENT DOCUMENTS

| | | | |
|---|---|---|---|
| 3,061,968 A * | 11/1962 | Stroud | A01K 83/06 43/44.8 |
| 3,750,323 A * | 8/1973 | Weis | A01K 85/00 D22/128 |
| 4,450,646 A | 5/1984 | Maltese | |
| 4,530,180 A * | 7/1985 | Gwaldacz, Sr. | A01K 85/00 43/44.81 |
| 4,972,623 A | 11/1990 | Delricco | |
| 5,105,575 A * | 4/1992 | Robertaccio | A01K 85/00 43/44.8 |
| 5,233,786 A | 8/1993 | Biss | |
| 5,537,775 A | 7/1996 | Crumrine | |
| 6,052,938 A | 4/2000 | Marusak et al. | |
| 6,058,643 A | 5/2000 | Marusak et al. | |
| 6,061,948 A | 5/2000 | Boucek | |
| 6,898,894 B1 * | 5/2005 | Anderson | A01K 85/00 43/42.39 |
| 7,263,798 B2 | 9/2007 | Nichols | |
| 7,827,731 B2 | 11/2010 | Gibson | |
| 7,877,923 B2 | 2/2011 | Dudley | |
| 8,635,804 B1 | 1/2014 | Lefebre | |
| 8,640,378 B2 | 2/2014 | Rye et al. | |
| 8,991,095 B2 | 3/2015 | Roberts et al. | |
| 9,003,689 B1 | 4/2015 | Rye et al. | |

(Continued)

FOREIGN PATENT DOCUMENTS

AU 2004275432 A1 * 5/2006 ............. A01K 85/00

OTHER PUBLICATIONS

Deepto Chakrabarty, et al., Classical Mechanics: Chapter 3 Vectors, 8.01SC 22, OpenCourseWare, Massachusetts Institute of Technology, Chapter 3, pp. 8-10 (Fall 2016), available at https://ocw.mit.edu/courses/8-01sc-classical-mechanics-fall-2016/resources/mit8_01scs22_chapter3/.*

*Primary Examiner* — Timothy D Collins
*Assistant Examiner* — Brittany A Lowery
(74) *Attorney, Agent, or Firm* — Dietz Law Office LLC

(57) ABSTRACT

A fishing jig having interchangeable jig heads that quickly interchanges various weighted jig heads without needing to disconnect the fishing jig hook from the fishing line. The jig head is aligned below a lengthwise axis of the hook and the eyelet of the hook is aligned above the lengthwise axis of the hook.

17 Claims, 12 Drawing Sheets

(56) References Cited

U.S. PATENT DOCUMENTS

| | | | |
|---|---|---|---|
| 9,185,891 B2 | 11/2015 | Nakamichi | |
| 9,253,966 B2 | 2/2016 | Scholfield | |
| 9,288,972 B1* | 3/2016 | Link | A01K 85/00 |
| 9,485,974 B1 | 11/2016 | Rye et al. | |
| 9,713,321 B2 | 7/2017 | Smith et al. | |
| 2010/0175305 A1 | 7/2010 | Heikkila et al. | |
| 2011/0035987 A1* | 2/2011 | Nicholson, III | A01K 85/00 43/42.4 |
| 2012/0005946 A1 | 1/2012 | Bennis | |
| 2014/0144063 A1 | 5/2014 | Hamilton, Jr. | |
| 2014/0237899 A1 | 8/2014 | Tamburro | |
| 2015/0272095 A1 | 10/2015 | Furuya | |
| 2019/0008128 A1* | 1/2019 | Walsh | A01K 85/16 |

\* cited by examiner

INTERCHANGEABLE FISHING JIG HEAD

CROSS-REFERENCE TO RELATED APPLICATIONS

This application claims the filing benefit and priority of U.S. Provisional Application Ser. No. 63/080,517 filed Sep. 18, 2020, the contents of which are incorporated herein by reference in its entirety.

FEDERAL SPONSORSHIP

Not Applicable

JOINT RESEARCH AGREEMENT

Not Applicable

TECHNICAL FIELD

This invention pertains generally to fish hooks used by fisherman. More particularly, this invention pertains to a fishing jig having interchangeable jig heads. The invention further pertains to a fishing jig assembly that quickly interchanges various weighted jig heads without needing to disconnect the fishing jig hook from the fishing line.

BACKGROUND

Over the years many variations of fishing lures have been made in an attempt to lure fish. Generally, the lure includes a hook portion, a body portion that is intended to attract fish, and an eyelet portion through which a fishing line is attached. Typically, bait will be attached to the hook end of the lure. Oftentimes, a fisherman will disconnect the lure from the fishing line to try a different lure having a different color, weight, or shape. This interchange of lures tends to waste bait. The present invention provides a lure that allows the fisherman to change the weight of the lure, predominant color of the lure, and the shape of the lure without the need to remove bait from the hook or disconnect the lure from the fishing line.

SUMMARY

Embodiments according to aspects of the invention include a jig assembly having interchangeable jig heads for interchanging jig heads without removing the hook from the fishing line. The jig assembly includes a jig hook, a jig head, a collar, and a coupler. The hook has a curved end portion, a straight spanning portion, a neck portion extending perpendicular from the straight spanning portion, and an eyelet end portion formed from an end of the neck portion. The collar is cylindrical and is engaged to the neck portion of the hook. The coupler includes a tube, wherein the tube has an aperture extending through the tube. The aperture is sized to engage an outer surface of the cylindrical collar. Also, a portion of the straight spanning portion of the hook extends through a mid portion of the tube. The interchangeable jig head has an end of the jig head shaped to engage with a sidewall of the aperture extending through the tube.

In an embodiment according to certain aspects of the invention the cylindrical collar has a length that approximates a length of the neck portion of the hook. Further, the length of the tube may be approximately twice a length of the neck portion of the hook. In this manner approximately half of the tube encompasses the collar and neck portion of the hook and the other approximate half of the tube encompasses a rim and stem portion of the jig head. The bulb of the interchangeable jig head extends out of an end of the tube. The end of the jig that is shaped to engage with the sidewall of the aperture extending through the tube is the rim of the jig head.

Embodiments according to aspects of the invention may further provide a length of the stem of the jig head that is slightly less than the length of the tube. Further, in accordance with certain embodiments of the invention the jig head may be aligned below a lengthwise axis of the hook while the eyelet portion of the hook is aligned above the lengthwise axis of the hook.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
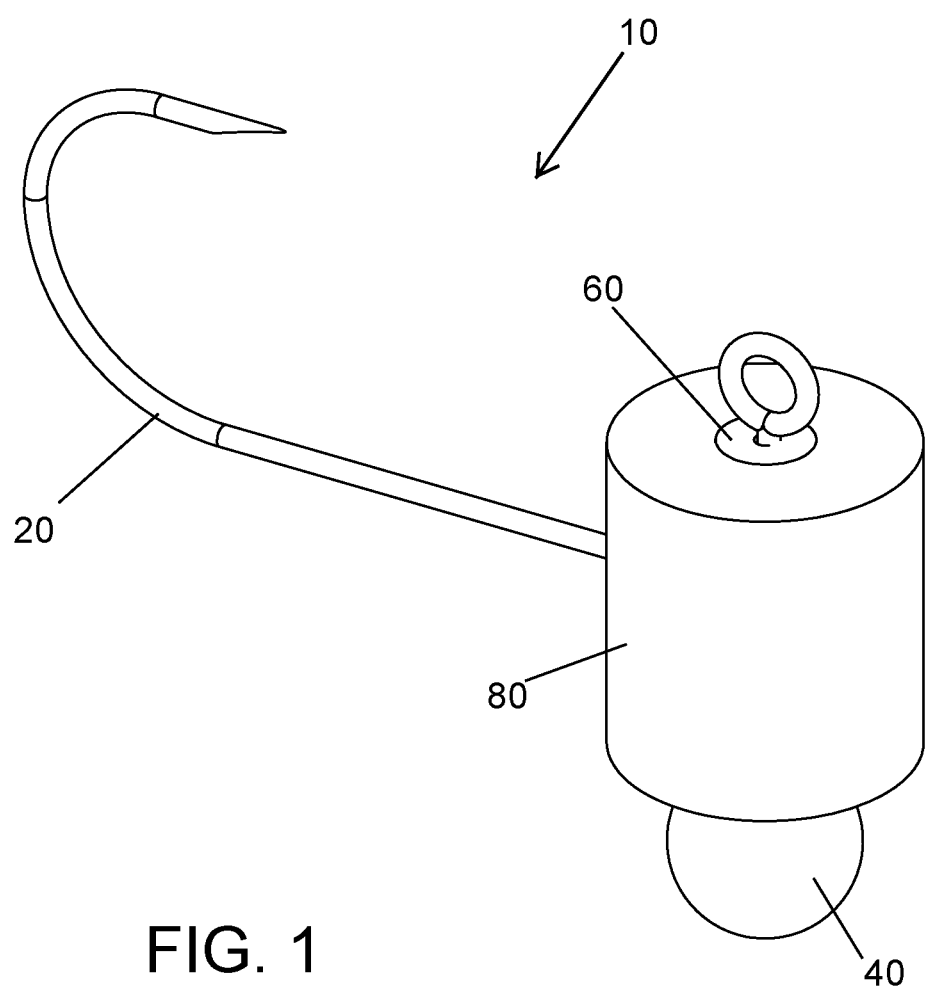
FIG. 1 is a perspective view of a jig assembly in accordance with an embodiment of the invention.
Figure 2:
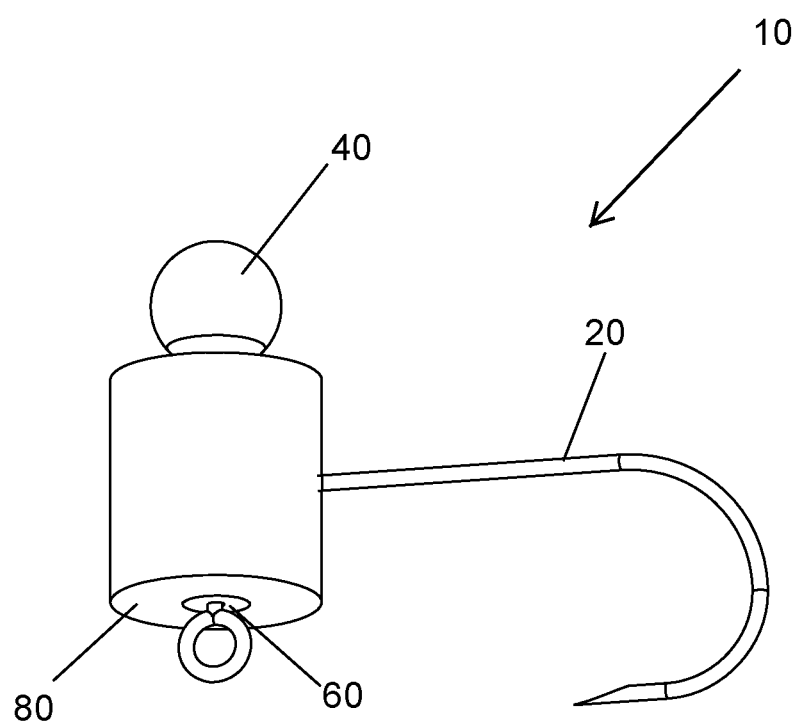
FIG. 2 is a bottom perspective view of a jig assembly in accordance with an embodiment of the invention.
Figure 3:
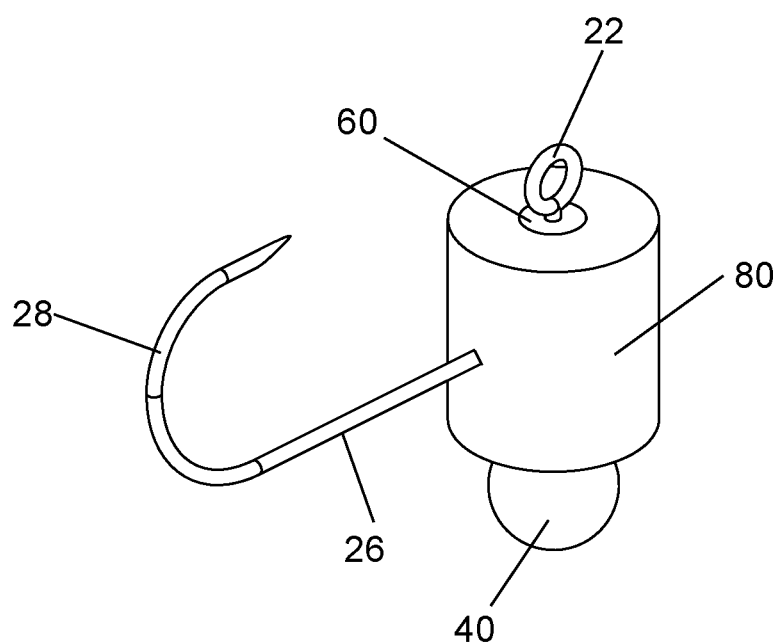
FIG. 3 is a perspective view of a jig assembly in accordance with an embodiment of the invention.
Figure 4:
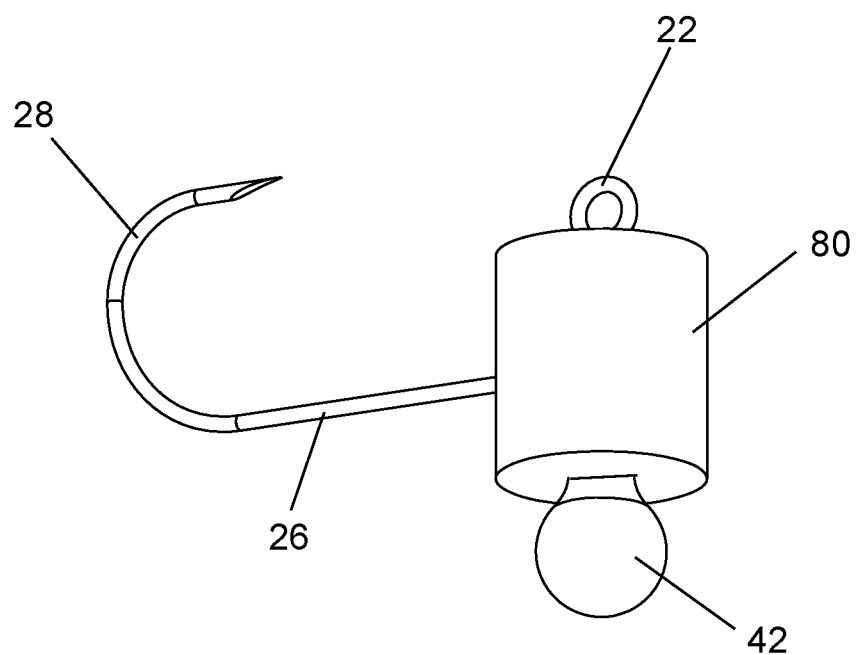
FIG. 4 is a bottom perspective view of a jig assembly in accordance with an embodiment of the invention.
Figure 5:
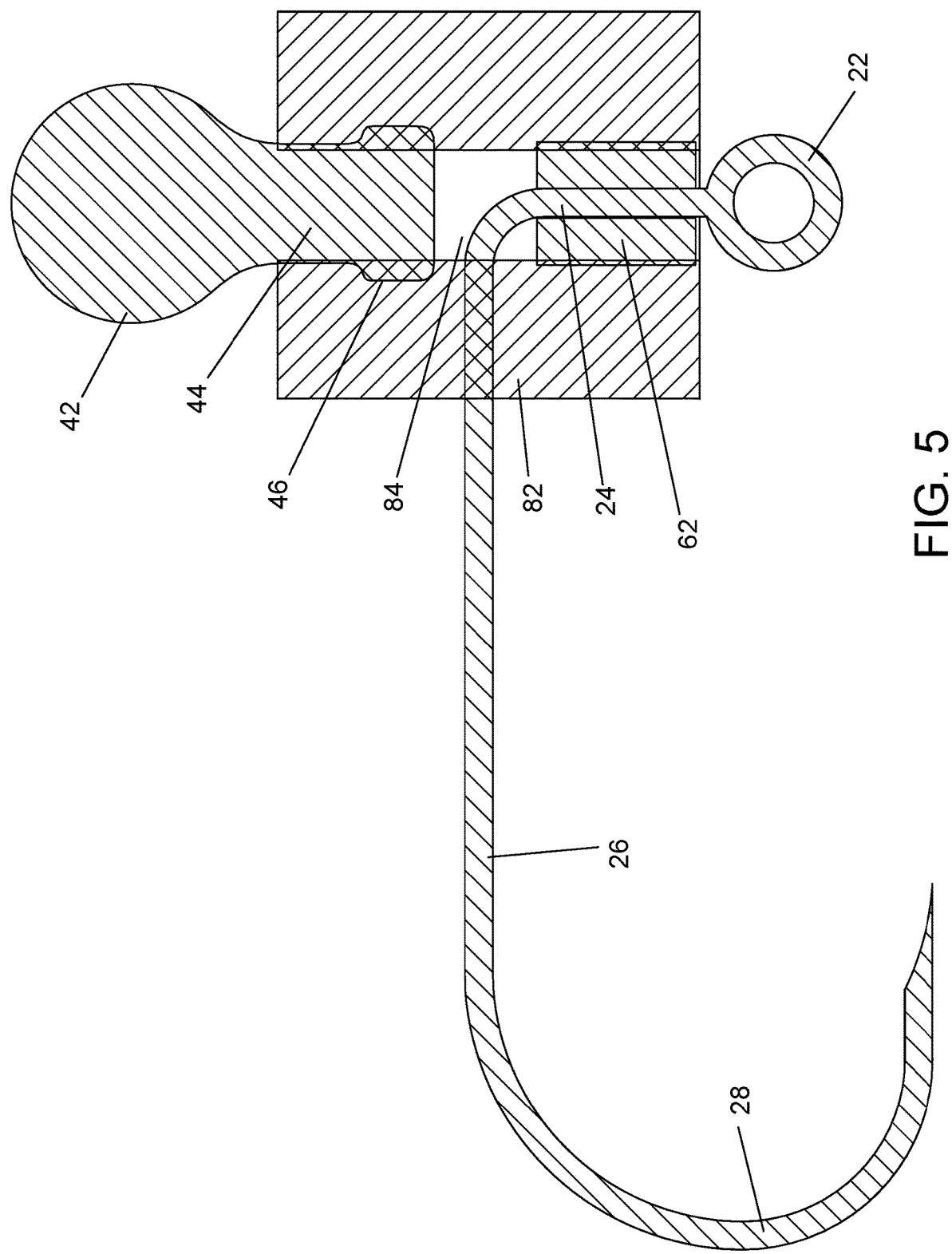
FIG. 5 is a partial sectional view of a jig assembly in accordance with an embodiment of the invention.
Figure 6:
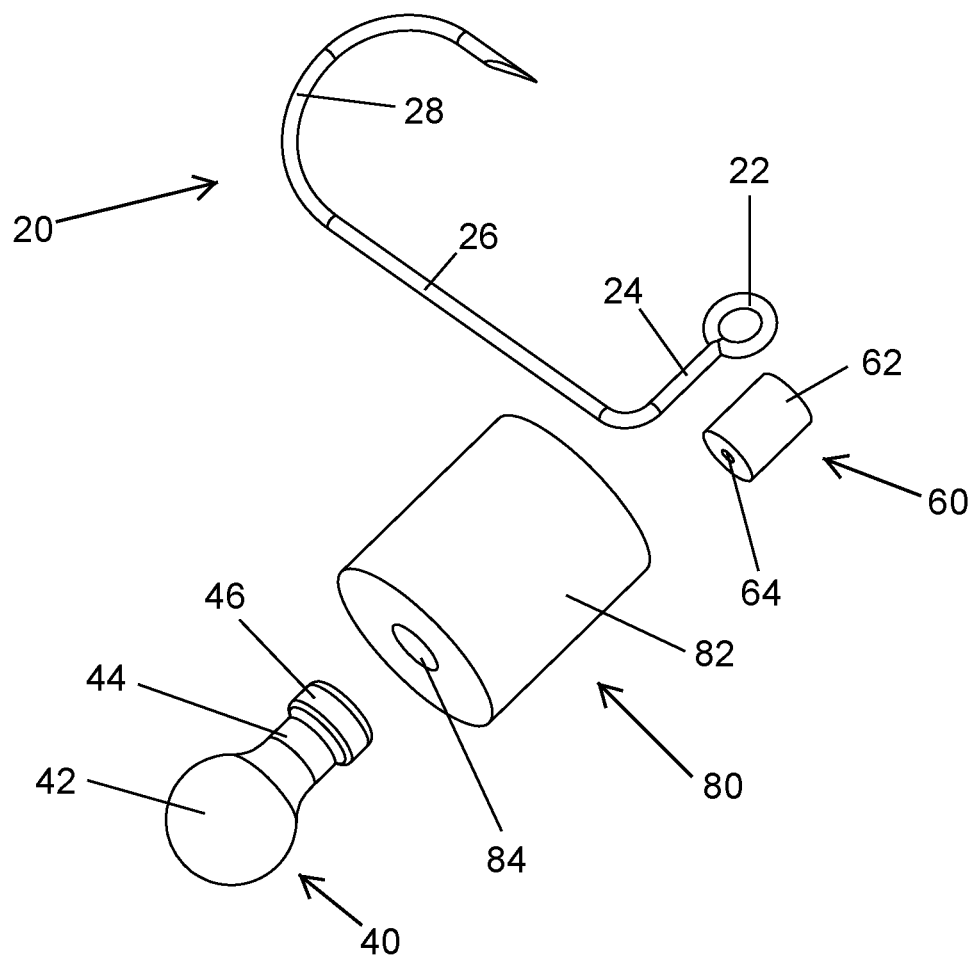
FIG. 6 is a perspective view of various components of the jig assembly in accordance with an embodiment of the invention.
Figure 7:
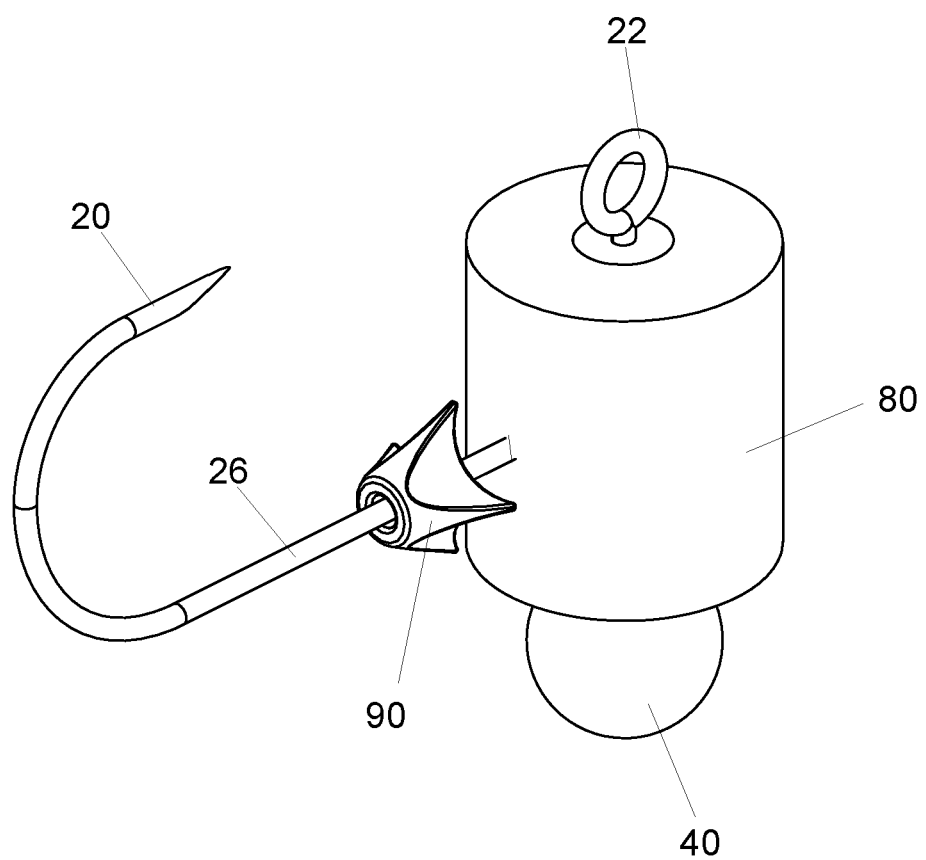
FIG. 7 is a top front left perspective view of the jig assembly in accordance with an embodiment of the invention having a bait retainer combined with the hook portion of the jig.
Figure 8:
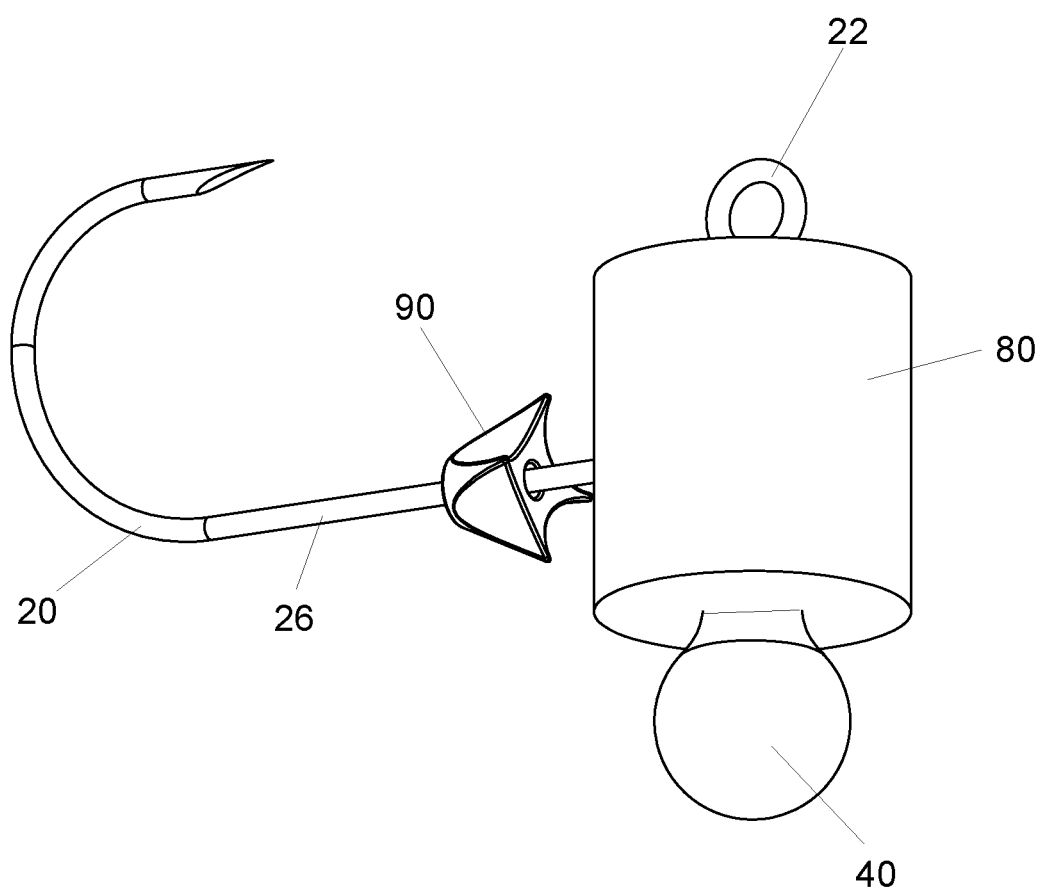
FIG. 8 is a bottom front right perspective view of the jig assembly in accordance with an embodiment of the invention having a bait retainer combined with the hook portion of the jig.
Figure 9:
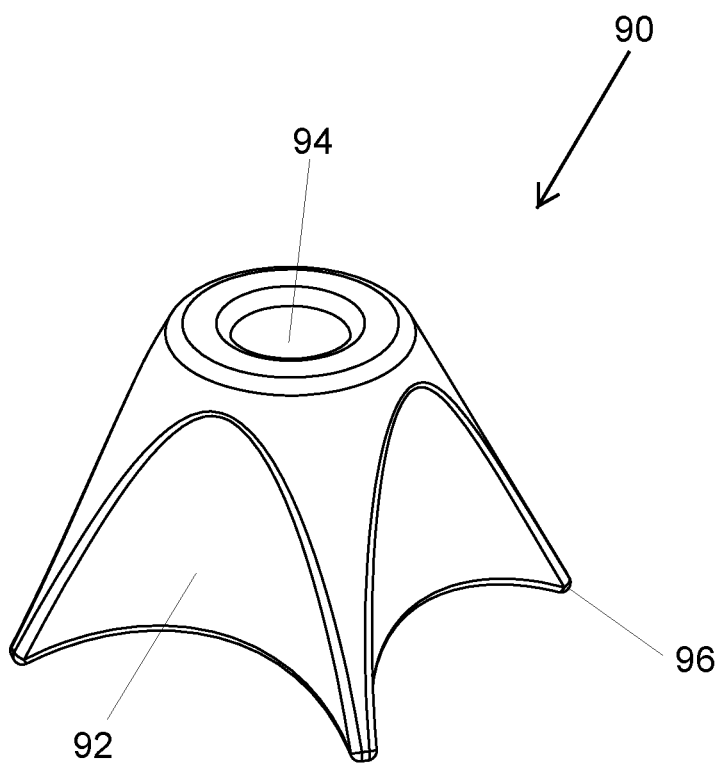
FIG. 9 is a top front perspective view of a bait retainer in accordance with an embodiment of the invention.
Figure 10:
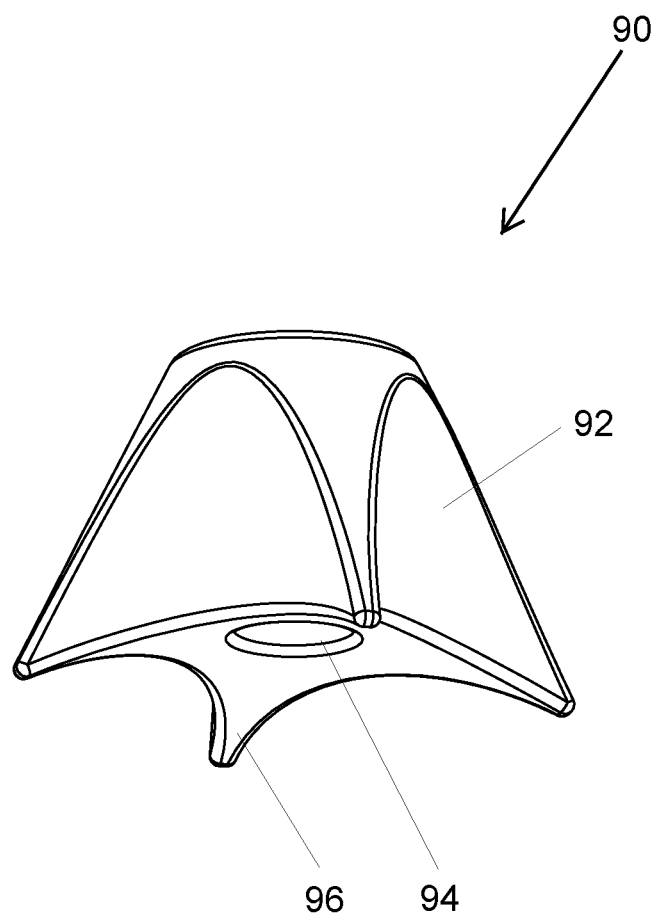
FIG. 10 is a bottom back perspective view of a bait retainer in accordance with an embodiment of the invention.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The jig assembly 10 of the present invention includes a jig hook 20, a jig head 40, a collar 60 and a coupler 80. The jig head 40 is interchangeable. The collar 60 is positioned on the neck portion 24 of the hook 20. A user may interchange various shaped and colored jig heads 40 without the need to remove the collar 60 and without the need to remove the hook from the fishing line. In this manner, the bait may remain on the hook while the fisherman interchanges different colored, weighted, or shaped jig heads.

Traditional fishing jigs include a jig head that is permanently molded onto a fishing hook with an eyelet sticking out of one end of the jig head and the remaining portion of the hook extending out the other side of the jig head. After the jig head is molded onto the hook, paint is applied to the jig head. Unfortunately, the paint tends to clog the eyelet making it difficult to thread a fishing line through the eyelet. When using the traditional jig head any change in color, size or shape of the jig requires removal of the jig from the fishing line, tying on a new lure, and replacing the bait.

The orientation of the jig head of the present invention is below the longitudinal axis of the fishing hook. This orientation changes the center of mass of the jig as compared to the traditional fishing jig. Further, orienting the jig head below the longitudinal axis of the fish hook tends to improve the likelihood that the hook sets securely into the fish's mouth. Also, at times a fisherman may desire to let the jig assembly drop to the bottom of the lake and then lift the jig up slightly while reeling in the line. The length of the coupler 80 may be varied to change the distance between the bottom of the lake and the hook as the weight touches the bottom during this jigging motion. Increasing the distance between the lake bottom and the hook may help prevent snags and increase the success of setting the hook.

Turning attention now to the Figures, embodiments of the jig assembly 10 of the present invention will now be described in more detail. The jig assembly 10 includes a jig hook 20, a jig head 40, a collar 60, and a coupler 80. The hook 20 has a curved end portion 28, a straight spanning portion 26 that defines the primary lengthwise axis of the hook, a neck portion 24 extending perpendicular from the straight spanning portion 26, and an eyelet 22 end portion formed from an end of the neck portion 24. The collar 60 has a cylindrical body 62 wherein an aperture 64 extends through the lengthwise axis of the cylindrical body. The neck portion 24 of the hook 20 extends through the aperture 64 of the collar 60. Once in position, the collar remains engaged to the neck 24 of the hook 20. The collar is preferably made from a stiff material (such as an ABS polymer) to further provide rigidity to the neck portion of the hook. When the coupler 80 is made of a transparent material the collar may be made from a variety of colors to allow a fisherman to change the appearance near the eyelet 22.

The coupler 80 includes a hollow tube 82 having an aperture 84 extending through the tube. The aperture 84 is sized to engage an outer surface of the cylindrical collar 60. The length of the tube 82 is selected so that the straight spanning portion of the hook extends through and out of a mid portion of the tube 82. The remaining portion of the tube extends downward below a lengthwise axis of the hook. In this manner the eyelet portion 22 of the hook 20 is aligned above the lengthwise axis of the hook 20.

Figure 11:
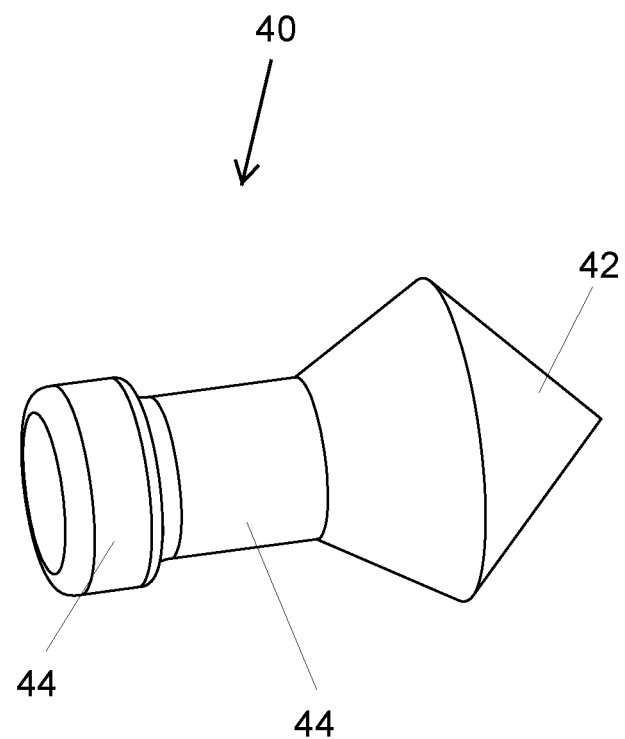
FIG. 11 is a top front perspective view of a jig head of the jig assembly in accordance with an embodiment of the invention.
Figure 12:
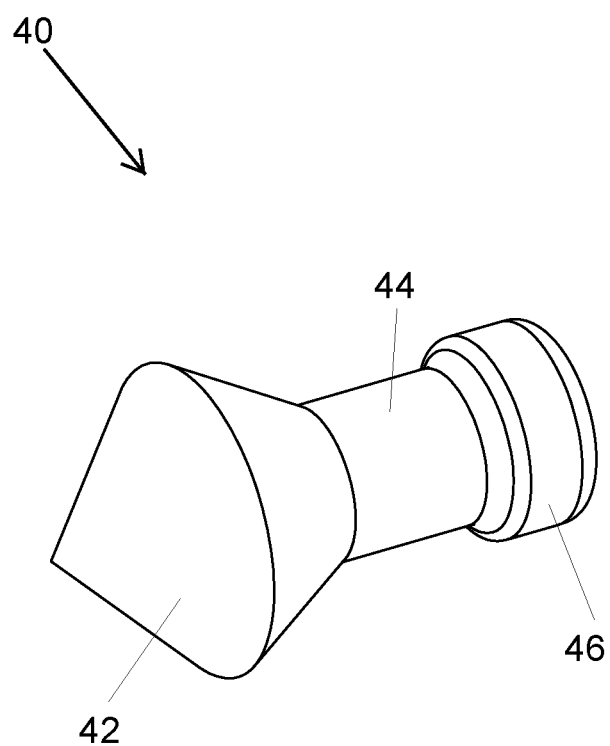
FIG. 12 is a bottom back perspective view of a jig head of a jig head assembly in accordance with an embodiment of the invention.

The interchangeable jig head 40 has an end or rim 46 of the jig head that is shaped to engage with a sidewall of the aperture 84 extending through the tube 82. A stem portion 44 interconnects the bulb or main body 42 with the rim 46. The diameter of the rim 46 may be sized larger than the diameter of the stem 44 so that only the rim contacts the inside sidewall of the tube 82. Alternatively, the diameter of both the rim 46 and stem 44 may both be larger than the aperture of the tube 82 such that tubing contacts and presses against both the rim and stem. The shape of the main body 42 may be spherical, elliptical, oblong, square, diamond, spoon, flattened sides or many or shapes to provide a varying appearance to the jig assembly. See FIGS. 11 and 12 that illustrate an alternate shaped jig head 40 of the present invention. Further the size of the main body and amount of material used to make the jig head may be varied to affect the weight of the jig head 40. Without limitation intended, the size may be modified such that the weight of the jig head 40 may range from 1/16 ounce to as much as 10 ounces or more. Also, as noted above, the bulb or main body of the jig head extends below an end of the tube and below the lengthwise axis of the hook 20.

The tube 82 is made from a pliable material and may be made from a variety of colors or transparent material (such as silicone). The aperture 84 is sized slightly smaller than the diameter of the rim 46. In this manner, the tube stretches over the rim and stem 44 and the jig head 40 is firmly held in place relative to the hook 20. Tubing may be provided with varying aperture diameters to allow the fisherman to choose how snug the rim 46 and stem 44 are held in place by the flexible tube. In some instances, such as jigging on the bottom, the fisherman may want the jig head to release from the tubing when the jig head snags on the bottom of the lake. Further, the length of the tubing may be selected to increase the probability that only the jig head snags on the lake bottom and the hook is elevated above the lake bottom to avoid snags.

With reference to FIGS. 7-10, the jig assembly 10 of the present invention may further include a bait retainer 90 positioned on the straight span 26 of the jig hook 20. The bait retainer includes a main body 92, an aperture 94 extending through the main body 92, and barbs 96 formed on one end of the main body. The bait retainer 90 is oriented on the hook 20 such that the bait will slide over the main body 92 but the barbs 96 restrict the bait from slipping over the main body in the opposite direction. The bait retainer is made from a suitable material and the aperture is sized such that the bait retainer may be slid over the hook 20 but stays in place on the hook once slid into position. Although not shown, those skilled in the art will appreciate that a spinner could be slid over the hook and the bait retainer could retain the spinner in a desired position on the hook.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A fishing jig assembly, for interchanging jig heads without removing the hook from the fishing line, the fishing jig assembly comprising:
    a hook having a curved end portion, a straight spanning portion, a neck portion extending perpendicular from the straight spanning portion, and an eyelet end portion formed from an end of the neck portion;
    a cylindrical collar engaged to the neck portion of the hook, whereby a longitudinal axis of the cylindrical collar extends perpendicular to the straight spanning portion of the hook;
    a coupler including a tube, wherein the tube has an aperture extending through the tube, whereby a longitudinal axis of the tube aligns parallel with the longitudinal axis of the cylindrical collar, and wherein the aperture is sized to engage an outer surface of the cylindrical collar and wherein a portion of the straight spanning portion of the hook extends through a mid portion of the tube; and
    an interchangeable jig head having an end of the interchangeable jig head shaped to engage with a sidewall of the aperture extending through the tube.

2. The fishing jig assembly as recited in claim 1, wherein the cylindrical collar has a length that approximates a length of the neck portion of the hook.

3. The fishing jig assembly as recited in claim 1, wherein a length of the tube is approximately twice a length of the neck portion of the hook.

4. The fishing jig assembly as recited in claim 1, wherein the interchangeable jig head has a bulb, a stem and a rim, wherein the end of the interchangeable jig head that is shaped to engage with the sidewall of the aperture extending through the tube is the rim of the interchangeable jig head.

5. The fishing jig assembly as recited in claim 3, wherein the interchangeable jig head has a bulb, a stem and a rim, wherein the end of the interchangeable jig head that is shaped to engage with the sidewall of the aperture extending through the tube is the rim of the interchangeable jig head.

6. The fishing jig assembly as recited in claim 5, wherein a length of the stem of the interchangeable jig head is slightly less than the length of the tube.

7. The fishing jig assembly as recited in claim 1, wherein the bulb, stem and rim of the interchangeable jig head is aligned below a lengthwise axis of the hook and the eyelet portion of the hook is aligned above the lengthwise axis of the hook.

8. A fishing jig assembly, for interchanging jig heads without removing the hook from the fishing line, the fishing jig assembly comprising:
    a hook having a curved end portion, a straight spanning portion, a neck portion extending perpendicular from the straight spanning portion, and an eyelet end portion formed from an end of the neck portion;
    a cylindrical collar engaged to the neck portion of the hook, wherein the cylindrical collar has a length that approximates a length of the neck portion of the hook, whereby a lengthwise axis of the cylindrical collar aligns perpendicular to the straight spanning portion of the hook;
    a coupler including a tube, wherein the tube has an aperture extending through the tube and wherein the aperture is sized to engage an outer surface of the cylindrical collar and wherein a portion of the straight spanning portion of the hook extends through a mid portion of the tube, wherein a length of the tube is approximately twice a length of the neck portion of the hook whereby a lengthwise axis of the tube aligns perpendicular to the straight spanning portion of the hook; and
    an interchangeable jig head having an end of the interchangeable jig head shaped to engage with a sidewall portion of the aperture extending through the tube opposite the cylindrical collar.

9. The fishing jig assembly as recited in claim 8, wherein the interchangeable jig head has a bulb, a stem and a rim, wherein the end of the interchangeable jig head that is shaped to engage with the sidewall of the aperture extending through the tube is the rim of the interchangeable jig head.

10. The fishing jig assembly as recited in claim 9, wherein a length of the stem of the interchangeable jig head is slightly less than the length of the tube.

11. A fishing jig assembly, for interchanging jig heads without removing the hook from the fishing line, the fishing jig assembly comprising:
    a hook having a curved end portion, a straight spanning portion, a neck portion extending perpendicular from the straight spanning portion, and an eyelet end portion formed from an end of the neck portion;
    a cylindrical collar engaged to the neck portion of the hook whereby a lengthwise axis of the cylindrical collar aligns perpendicular to the straight spanning portion of the hook;
    a coupler including a tube, wherein the tube has an aperture extending through the tube and wherein the aperture is sized to engage an outer surface of the cylindrical collar and wherein a portion of the straight spanning portion of the hook extends through a mid portion of the tube such that approximately half of a length of the tube extends outwardly perpendicularly above the straight spanning portion of the hook and an other approximately half of the length of the tube extends outwardly perpendicularly below the straight spanning portion of the hook;
    an interchangeable jig head having an end of the interchangeable jig head shaped to engage with a sidewall of the aperture extending through the tube below the straight spanning portion of the hook; and a bait retainer positioned on the hook between the curved end portion and neck portion of the hook.

12. The fishing jig assembly as recited in claim 11, wherein the cylindrical collar has a length that approximates a length of the neck portion of the hook.

13. The fishing jig assembly as recited in claim 11, wherein a length of the tube is approximately twice a length of the neck portion of the hook.

14. The fishing jig assembly as recited in claim 11, wherein the interchangeable jig head has a bulb, a stem and a rim, wherein the end of the interchangeable jig head that is shaped to engage with the sidewall of the aperture extending through the tube is the rim of the interchangeable jig head.

15. The fishing jig assembly as recited in claim 13, wherein the interchangeable jig head has a bulb, a stem and a rim, wherein the end of the interchangeable jig head that is shaped to engage with the sidewall of the aperture extending through the tube is the rim of the interchangeable jig head.

16. The fishing jig assembly as recited in claim 15, wherein a length of the stem of the interchangeable jig head is slightly less than the length of the tube.

17. The fishing jig assembly as recited in claim 15, wherein the bulb, stem and rim of the interchangeable jig head is aligned below a lengthwise axis of the hook and the eyelet portion of the hook is aligned above the lengthwise axis of the hook.

\* \* \* \* \*